United States Patent [19]
Yao et al.

[11] Patent Number: 5,406,949
[45] Date of Patent: Apr. 18, 1995

[54] DIGITAL PROCESSING FOR STEERABLE CW DOPPLER

[75] Inventors: Lin X. Yao, Bellevue, Wash.; Gregg Miller, Bisbee, Ariz.

[73] Assignee: Siemens Medical System, Iselin, N.J.

[21] Appl. No.: 276,749

[22] Filed: Jul. 18, 1994

[51] Int. Cl.⁶ .............................................. A61B 8/00
[52] U.S. Cl. ............................ 128/662.01; 128/661.01
[58] Field of Search ................. 128/660.07, 661.01, 128/661.07, 661.08, 662.01

[56] References Cited

U.S. PATENT DOCUMENTS

| | | | |
|---|---|---|---|
| 4,333,353 | 6/1982 | Baumoel | 128/662.01 |
| 4,416,286 | 11/1983 | Iinuma et al. | 128/663 |
| 4,438,652 | 3/1984 | Saito | 73/861.25 |
| 4,460,924 | 7/1984 | Lippel | 358/310 |
| 4,543,599 | 9/1985 | Willis et al. | 358/13 |
| 4,598,589 | 7/1986 | Riley et al. | 73/609 |
| 4,651,745 | 3/1987 | Namekawa et al. | 128/663 |
| 4,758,893 | 7/1988 | Lippel | 358/209 |
| 4,764,748 | 8/1988 | Geen et al. | 340/347 |
| 4,812,846 | 3/1989 | Noro | 341/131 |
| 4,915,115 | 4/1990 | Sasaki et al. | 128/660.05 |
| 5,016,641 | 5/1991 | Schwartz | 128/661.09 |

Primary Examiner—George Manuel

[57] ABSTRACT

A Doppler medical ultrasound apparatus, comprising means for transmitting ultrasound energy into a body, a plurality of parallel channels for receiving echoes of the ultrasound energy, digitizing the echoes, and digitally forming a received beam signal therefrom, means for processing the beam signals to produce a Doppler signal representing movement in a target volume within the body, and means for displaying the Doppler signal, and further including a summing circuit for summing a common dither signal with each of the received echoes and an A/D converter for digitizing the received echo in each parallel channel having the common dither signal added thereto.

9 Claims, 2 Drawing Sheets

DIGITAL PROCESSING FOR STEERABLE CW DOPPLER

BACKGROUND OF THE INVENTION

1. Field of the Invention

This invention relates to ultrasonic Doppler diagnostic devices having a Doppler mode, and in particular, to a medical ultrasound device that uses multi-channel digital signal processing of a received continuous wave (CW) ultrasound echo signal for developing Doppler data.

2. Description of the Prior Art

The ultrasonic Doppler method is widely used for non-invasively detecting and measuring movement within a body, and finds wide use in medical ultrasound scanners for non-invasive diagnostic analysis of blood flow within a patient, e.g., for the detection and measurement of blood flow within the heart, blood vessels, etc., of a patient.

There are basically two operational modes of ultrasound Doppler; continuous wave (CW) and pulsed (PW). The PW mode is particularly useful for obtaining velocity data used to form a two-dimensional blood flow image (color flow image). However, because the pulse repetition rate (PRF) of PW Doppler systems limits the maximum flow velocity which can be determined without aliasing, the CW mode is found to be particularly useful for obtaining velocity data to accurately determine relatively high flow velocities.

Additionally, diagnostic ultrasound devices conventionally develop a so-called B-mode image, which is basically a two dimensional tomographic image, as well known to those skilled in the art. The B-mode image is formed using a transducer which can scan an area, and conventionally uses, as also well known in the art, one of several types of multiple element transducer arrays, such as a linear array of 64 or 128 transducer elements. On the other hand, CW Doppler operation generally requires the use of a special transducer probe which has two transducers, one for transmission and one for reception (as also well known in the art and commonly referred to as a pencil probe). It is desirable, for the sake of simplicity, to use a single probe and its receive signal processing circuitry to obtain the data useful for not only the Doppler mode, but also the B-mode. One technique to accomplish this is described in U.S. Pat. No. 4,915,115 entitled "Ultrasonic Imaging Apparatus for Displaying B-Mode and Doppler-Mode Images" and issued Apr. 10, 1990 to Sasaki et al. As described therein, data is obtained by first operating the transducer array via conventional transmit/receive control circuitry so as to provide steering and focusing of the transmitted ultrasound pulses and for providing appropriate individual delays to the received signals so that a conventional beamformer and image processor can create the B-mode image. Thereafter, the user can observe the B-mode image, and mark the image using a cursor with an indication of direction and depth from which PW Doppler data is desired to be obtained. Then, the transducer is operated in the PW Doppler mode so as to receive Doppler echoes and develop therefrom Doppler data. It is noted that the CW Doppler mode is not specifically described by Sasaki et al. Instead, Sasaki et al. is concerned with the reception efficiency of the transducer when it is desirable to operate it in both of the Doppler and B-mode, and solves this problem by providing an ultrasonic transducer having two peaks in its reception efficiency characteristic curves, one centered at the frequency used for B-mode imaging and the other centered at the frequency used for PW Doppler data gathering.

Using a multi-element transducer array for the CW Doppler mode is desirable because the transmit beam steering and reception focusing results in improved signal-to-noise (S/N) performance as well as an opportunity to better select the Doppler sample volume (the overlap regions between the CW transmit and receive beams). U.S. Pat. No. 4,598,589 entitled "Method of CW Doppler Imaging Using Variably Focused Ultrasonic Transducer Array" and issued Jul. 8, 1986 to Riley et al. describes operation of a multi-element transducer array for obtaining CW Doppler images, using conventional analogue signal processing techniques.

It is noted that the beamforming signal processing for B-mode imaging is starting to include digital techniques, while CW Doppler is currently carried out using analogue techniques. It would be desirable, however, to include a dual mode of operation for a multi-element transducer array which would allow for B-mode or CW Doppler operation while using the same digital beamforming techniques currently used for B-mode processing. Digital beamforming techniques are desirable because of the greater flexibility they offer under microprocessor control as compared to analogue circuits. However, a signal-to-noise (S/N) problem arises when trying to use digital processing for the CW Doppler echoes, which problem does not arise when processing PW Doppler or B-mode echoes. That is, in PW Doppler and B-mode imaging the conventional pulse operation, in combination with the range gating techniques, result in non-detection of large amplitude clutter signals which are caused by inter-transducer element crosstalk of the transmitted ultrasound signals and the reflection of the transmitted ultrasound signals from near-field reflectors. Since these signals are so much stronger than the desired signal, in the order of 80 to 100 dB, a problem exits in that the dynamic range of the echo digitization is currently limited to about 60 dB since such high speed (e.g., 36 mHz) A/D converters provide at most 10 bit output words. Furthermore, it is not technically and/or economically feasible to increase the dynamic range of the A/D converters in the foreseeable future to allow digital detection of the very low level Doppler shift signals in the presence of the very strong clutter signals.

One would think, however, that the known technique of signal dithering could be used to improve the dynamic range performance of the A/D converters. In this regard, one would expect that when multiple parallel channels are digitizing and processing received echoes to create the Doppler information signal, a different source of dithering signal would be required for each digitizing signal processing channel, so as to prevent the same dither signal from being added to each received signal and result in coherent addition of the dither signal in the finally formed beam. This requirement would result in a significant increase in circuitry, complexity and cost, to accomplish steerable CW Doppler.

It is an object of the present invention to allow a CW Doppler mode of operation for an ultrasound imaging apparatus which uses a multi-element transducer array.

It is a further object of the invention to allow the CW Doppler echo signals to be processed using the same digital beamforming circuitry used for the B- or PW Doppler modes of operation.

It is a still further object of the invention to provide such digital beamforming processing in a simple and low cost arrangement.

These and other objects of the invention will become apparent from the following detailed description of a preferred embodiment of the invention, the accompanying drawings and the claims.

SUMMARY OF THE INVENTION

In accordance with one aspect of the invention, in an ultrasonic imaging apparatus having a multi-element piezoelectric transducer and a digital beamformer for developing B-mode images, a plurality of elements in the piezoelectric transducer are used to receive CW Doppler echo signals. Each received CW Doppler signal is applied to a respective one of a plurality of A/D converters. A single dither source generates a dither signal which is applied in common to each of the A/D converters. As well known, a dither signal can generally be used to increase the dynamic range of an A/D converter, however, since ultrasound beamforming comprises the coherent summation of the echo signals from many parallel channels, one would expect that a common dither signal would also undergo coherent summation in a beamformer and result in an unacceptably large dither artifact in the formed beam. Thus, in designing a digital beamformer for processing a CW Doppler signal, one would expect that each parallel channel should have its own dither signal which is not coherent with the dither signal of the other parallel channels. However, in accordance with the present invention a single dither signal is applied in common to each of the A/D converters. The present inventor has recognized that the different delays and slight difference in amplification in signal processing which exist among the many parallel channels of the beamformer are sufficient to prevent the dither signal applied to each channel from being added coherently during the beamforming process.

In accordance with a further aspect of the invention, a periodicity of the quantization error of the A/D converters which results from sampling of the CW Doppler signal, is filtered out by appropriate selection of the parameters of the digital filters which are included in the Doppler processor.

In accordance with a still further aspect of the invention, the dither signal is made to be sinusoidal in order that it can also be easily filtered out by the Doppler signal processing, such as the wall filters.

DETAILED DESCRIPTION OF THE INVENTION

Figure 1:
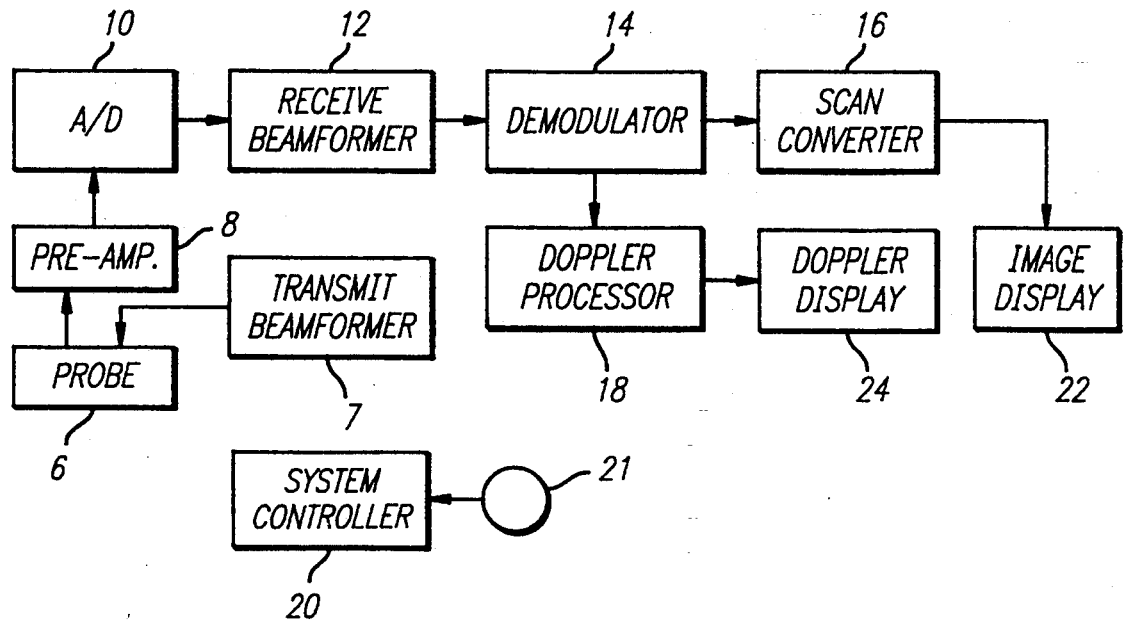
FIG. 1 is a block diagram of a medical ultrasound system in which the present invention may be used.

FIG. 1 illustrates in block diagram form a medical ultrasound system in which the present invention may be used. The system comprises an ultrasound probe 6 including a multi-element ultrasonic transducer having multiple piezoelectric transducer elements arranged in, for example, a linear array, a transmit beamformer 7, an analog pre-amplifier section 8 and an A/D conversion stage 10. Additionally, the system comprises a digital receive beamformer 12, a demodulator 14, a scan converter 16, a Doppler processor 18 and a system controller 20. As well known, transmit beamformer 7 includes controllable delay means for causing focused and steered ultrasound beams to be transmitted into the patient via the probe 6 and receive beamformer 12 includes controllable delay means for forming receive beams from received echoes resulting from reflections of the ultrasound beams transmitted into the patient, all under the control of system controller 20.

System controller 20 includes user interface means 21 including devices such as a keyboard, trackball, switches, etc. (not specifically shown), through which an operator of the system may place the system in a B-imaging mode, a PW Doppler mode, a simultaneous imaging/PW Doppler mode or a CW Doppler mode. In the B-imaging mode, beamformer 12 produces RF signals at its output that represent the strength of the ultrasound echoes received along a series of scanning lines spread through a cross-section of the patient's body. These RF signals are demodulated by demodulator 14, the demodulator essentially performing a detection function on the RF signals produced during the B-imaging mode. The resulting detected image signal provided at the output of demodulator 14 is passed to scan converter 16. As well known, the scan converter accumulates echo data for a plurality of scan lines that make up a single frame of the image. For a sector scan format, the scan converter also converts such data into a rectangular raster scan format suitable for display on a video monitor. Successive image frames are then displayed in real time on a video image display 22.

When the system is set by the user to a PW Doppler mode, the operator marks the position of a sample volume from which the PW Doppler data is to be collected, by examining and marking the B-mode image. The marked volume is correlated to a sample cell at a selected range along a selected scan line, while for CW Doppler, the Doppler sensitive volume is conventionally cylindrical and extends along the length of the scan line. However, in the current embodiment which uses a multi-element transducer array, focused and steered CW Doppler beams are possible, and therefor with appropriate control of the transmit and receive delays it is possible to have a CW Doppler sensitive volume which comprises an overlap of the focussed and steered CW transmit and CW receive beams. Receive beamformer 12 then generates a continuous RF beam line representative of the echo signals received from the beam direction which includes the selected Doppler sensitive volume. Demodulator 14 converts the RF beam line signals produced during the Doppler mode to baseband or to an intermediate frequency, and produces demodulated in-phase (I) and quadrature (Q) signals at its output which are provided to Doppler processor 18. These I and Q signals are collectively referred to as the "Doppler signal". Doppler processor 18 processes the Doppler signal and provides signals to a Doppler display 24 which may include a video display for displaying a video output of the spatial characteristics of the Doppler signal on a video display, as well as an audio output that is converted to an audible sound by a Doppler audio display, such as speakers (not specifically shown). The construction and operation of a substantial portion of each of the individual components described above are well known by those of ordinary skill in the art, and therefore further description of their construction and operation, other than as needed to understand the present invention, is omitted.

Figure 2:
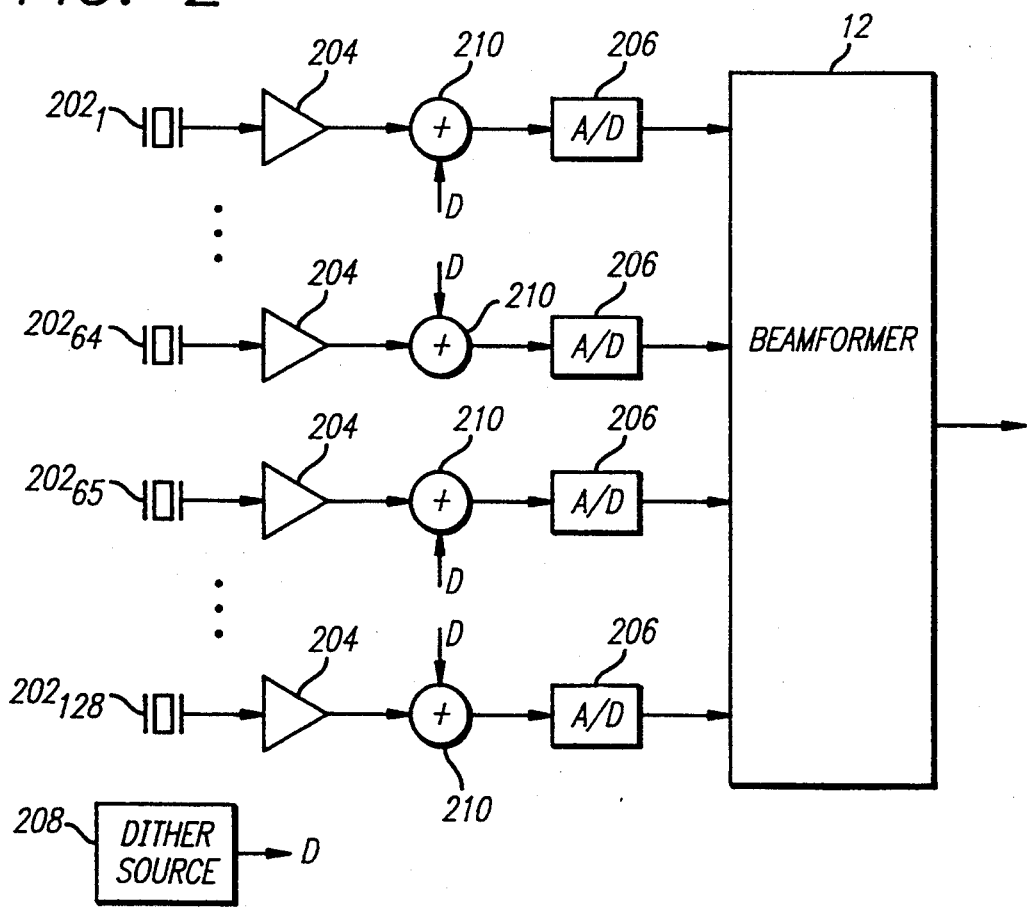
FIG. 2 is a block diagram of a portion of the front end of the medical ultrasound system shown in FIG. 1, which shows a first aspect of the present invention.

FIG. 2 illustrates details of portions of the ultrasound apparatus of FIG. 1. Where appropriate, the same reference numbers are used to indicate the same portions of the ultrasound apparatus. For clarity purposes, only the receive portions of the medical ultrasound apparatus are shown, the transmit portions being omitted in that they are unnecessary to understanding the present invention and are of conventional design and operation. As shown in FIG. 2, the probe includes a plurality of individual transducer elements 202. Each element 202 is connected to a signal processing channel comprising an analog pre-amplifier 204 and an A/D converter 206 which provides a digitized received ultrasound echo signal to the digital beamformer 12. As noted previously with respect to FIG. 1, receive beamformer 12 provides an appropriate delay to each of the received and digitized ultrasound echo signals so that they can be coherently combined to form an ultrasound beam line 22.

In accordance with one aspect of the present invention, a dither signal source 208 provides a common dither signal D which is added to each received echo beam signal before digitization by A/D converters 206, via an adder 210 which is included in each channel just before the A/D converter 206. As noted in the Background portion herein, dithering of the A/D converters increases their ability to detect a lower amplitude signal, thereby effectively increasing the dynamic range of the A/D converters. This increase, although particularly useful when operating the apparatus in the CW Doppler mode, may also find use while operating the apparatus in the PW Doppler mode.

As well known by those familiar with A/D converters, the dither signal causes extra transitions of the least significant bit (LSB) of the digital signal developed by A/D converters 206. The dither signal source 208 provides a dither signal having an amplitude which, for example, causes the LSB to vary $+/-0.5$ LSB. As a result of an averaging operation, preferably located at a point near the output of the signal processing apparatus (described in conjunction with the box car filters of FIG. 4), there is an apparent increase in resolution of the A/D conversion.

In a preferred embodiment, and in accordance with a further aspect of the invention, the dither signal is caused to be sinusoidal, so it can be easily removed by filters which already exist in Doppler processor 18, such as wall filters, to be described later on. This way, the dither signal itself does not degrade the S/N performance of the A/D converters, while a random noise dither signal would degrade the S/N performance.

Figure 3:
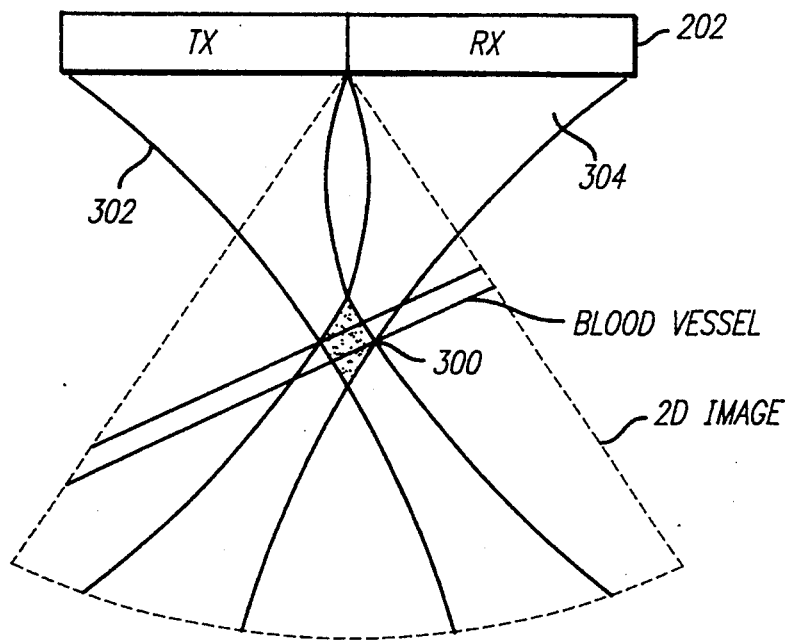
FIG. 3 is an illustration of how a CW Doppler area is selected using the apparatus of FIG. 1.

In a preferred embodiment probe 6 includes 128 transducer elements 202 wherein 64 adjacent elements, and their respective transmit and receive signal processing channels, are used for transmitting a focussed and steered CW ultrasound beam (for example at 4 mHz) into the body of a patient and the next 64 channels are used for controllably receiving a focussed CW Doppler beam which is focussed for a given depth within the patients body, such as shown in FIG. 3. An operator of the apparatus can operate a controllable interface device 21, such as a track ball (not shown) for selecting a CW Doppler sensitive volume 300 from which it is desired to obtain Doppler data. Once the volume is selected, the system controller 20 provides appropriate delays to the transmit and receive beamformers 7 and 12 so as to control the steering and focussing of the transmit 302 and receive 304 beams in order that they overlap at the selected volume and thereby obtain Doppler data representative of movement in that volume.

Figure 4:
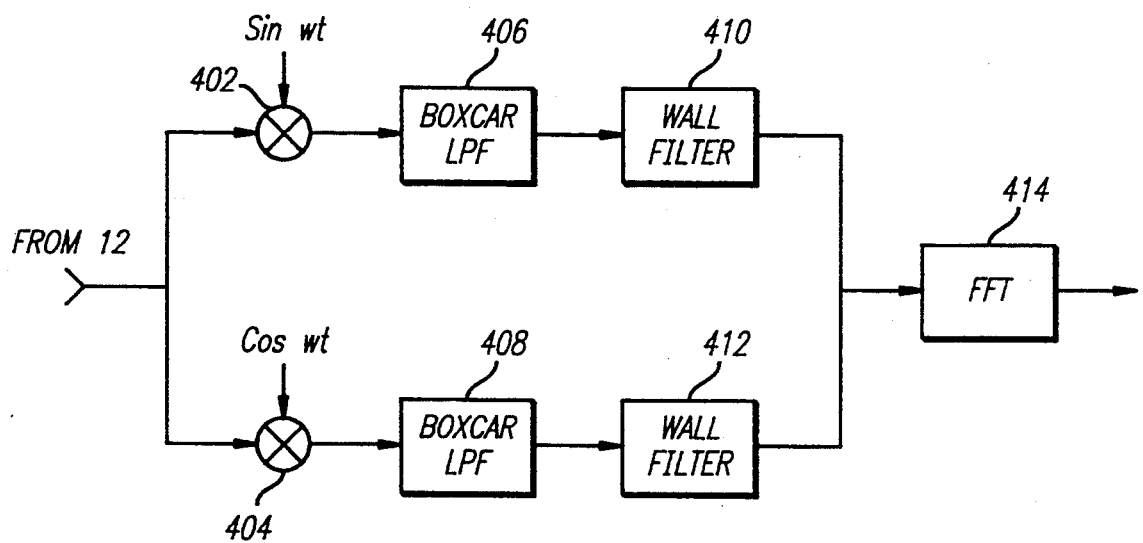
FIG. 4 is a block diagram of the demodulator and Doppler processor portions of the ultrasound system shown in FIG. 1, and which shows a further aspect of the present invention.

FIG. 4 illustrates the demodulator and Doppler processor portions of the ultrasound system shown in FIG. 1, configured by system controller 20 for processing the CW Doppler signals and developing Doppler data for display therefrom. More specifically, the demodulator portion 14 includes mixers 402 and 404 which are driven by quadrature sinusoidal signals having the frequency of the transmitted CW Doppler ultrasound signal (e.g. 4 mHz) for developing quadrature I and Q demodulated Doppler signals. Low pass filtering of the I and Q signals is conventionally required in order to remove the $2f_0$ frequency components, and in the present embodiment the low pass filters are constructed as box car filters 406 and 408 which accumulate and decimate the digital signals provided by mixers 402 and 404, respectively. As well known by those of ordinary skill in digital signal processing technology, box car filtering is essentially the accumulation or summation of a plurality of digital signal samples and then an averaging of the samples by dividing the accumulation sum by the number of samples accumulated, and finally decimation so as to provide a single multi-bit (i.e., 24 bit) digital word at its output. In the present embodiment, 504 digital signal samples are used to generate each digital word output from the box car filters. Each digital word is representative of one of, for example, 128 points along a selected beam line.

The I and Q outputs are then applied to Doppler processor 18, which as well known to those of ordinary skill in the art, comprises wall filter processing of the I and Q signals using wall filters 410 and 412 and, as one way of obtaining spectrum information, applying the output of the wall filters to a fast fourier transform (FFT) processor 414. FFT processor 414 provides at its output a signal representing the frequency spectrum of the Doppler signal which can be applied to audio speakers for "displaying" the Doppler data, or to one-half of a video screen, so as to display a Doppler image along side the B-mode image. As well known, wall filters 410, 412 can comprise high pass filters which cut-off the unwanted lower frequencies, including the forenoted sinusoidal dither signal. The Doppler signal at the output of FFT processor 414 is then provided to the Doppler display which includes a video monitor and audio speakers for presenting the Doppler information to the system operator.

In accordance with a further aspect of the invention, the length of box car filters 406, 408 are set so that the box car length (accumulation interval) comprises an integer number times the number of samples of the clutter signal/cycle. That is, if for example, the A/D converter sample rate is 36 mHz and the CW Doppler signal frequency is 4 mHz, there will be 9 A/D samples/cycle of the Doppler signal. Therefore, the number of samples averaged by the box car filters for determining each Doppler data point, i.e., the box car length, should be an integer number times 9, such as 504 which is 56×9. This is important in that the clutter signal causes a periodicity to occur in the quantization error of the A/D converter, which, due to the relatively high amplitude of the clutter signal, may easily have an amplitude which is an order of magnitude greater than the amplitude of the Doppler signal that the apparatus is trying to detect. By making the length of the box car filter an integer multiple of the number of A/D samples/cycle of the ultrasound frequency, the error over the box car length becomes a constant, and therefore no longer hinders detection of the low level Doppler signal.

It should be noted that the present invention can also be used when processing PW Doppler data. In this used with PW Doppler, there will not be as large a number case, however, due to the PRF (pulse repetition frequency) and range gating techniques conventionally of signal samples as there were during the CW Doppler mode. That is, assuming that the PW ultrasound frequency is 4 mHz and that 6 cycles of the signal are provided each PRF, approximately 50 useful digital samples would be provided within a range gate by A/D converters operating at 36 mHz. Therefore, an appropriate length for the box car filters would be 45 samples (i.e., 5 times 9).

Thus, there has been shown and described a novel method and apparatus for providing steerable CW Doppler in an ultrasound imaging apparatus which satisfies all the objects and advantages sought therefor. Many changes, modifications, variations and other uses and applications of the subject invention will, however, become apparent to those skilled in the art after considering this specification and its accompanying drawings which disclose preferred embodiments thereof. For example, a white noise dither signal can be used in place of a sinusoidal dither signal. Furthermore, although in the illustrated embodiment a single receive beamformer is shown, the beamformer may in fact comprise a plurality of partial beamformers, each contributing a portion of a beam signal, either along the same beam line or perhaps a beam line with a different elevation, for forming the final Doppler beam. In this case, it may be dither signal generator, applying a common dither signal to all of the parallel channels included therein. All such changes, modifications, variations and other uses and applications which do not depart from the spirit and scope of the invention are deemed to be covered by the invention which is limited only by the claims which follow.

We claim:

1. A Doppler medical ultrasound apparatus, comprising:
   means for transmitting ultrasound energy into a body;
   a plurality of parallel channels for receiving echoes of the ultrasound energy, digitizing said echoes, and digitally forming a received beam signal therefrom;
   means for processing the beam signal to produce a Doppler information signal representing movement in a target volume within the body; and
   means for displaying the Doppler signal,
   each parallel channel including a summing circuit for summing a common dither signal with each of the received echoes, and an A/D converter for digitizing the received echo having said common dither signal added thereto.

2. Apparatus in accordance with claim 1 wherein said means for transmitting and said plurality of parallel channels for receiving are caused to transmit and receive a continuous wave ultrasound signal.

3. Apparatus in accordance with claim 2 wherein said means for transmitting and said parallel channels for receiving each include a given number of elements of a multiple element ultrasound transducer array.

4. Apparatus in accordance with claim 2 wherein the means for displaying comprises an FFT processor coupled to a video display for causing display of the frequency spectrum of the Doppler signal.

5. Apparatus in accordance with claim 1 wherein said common dither signal is generated by a single dither signal generator.

6. Apparatus in accordance with claim 5 wherein said dither signal generator generates a sinusoidal dither signal.

7. Apparatus in accordance with claim 6 wherein said means for processing the received beam signal includes a low pass filter for filtering out said sinusoidal dither signal from said received beam signal.

8. Apparatus in accordance with claim 1 wherein said processing means includes a box car filter having a sample length which is an integer number times the number of digital samples generated by the A/D converter for each cycle of the ultrasound energy transmitted into the body.

9. Apparatus in accordance with claim 7 wherein said low pass filter includes a box car filter having a sample length which is an integer number times the number of digital samples generated by the A/D converter for each cycle of the ultrasound energy transmitted into the body.

* * * * *